Oct. 3, 1967
K. B. EVERARD ETAL
3,345,439
RIGID THERMOPLASTIC STRUCTURES
Filed Aug. 5, 1963
2 Sheets-Sheet 1
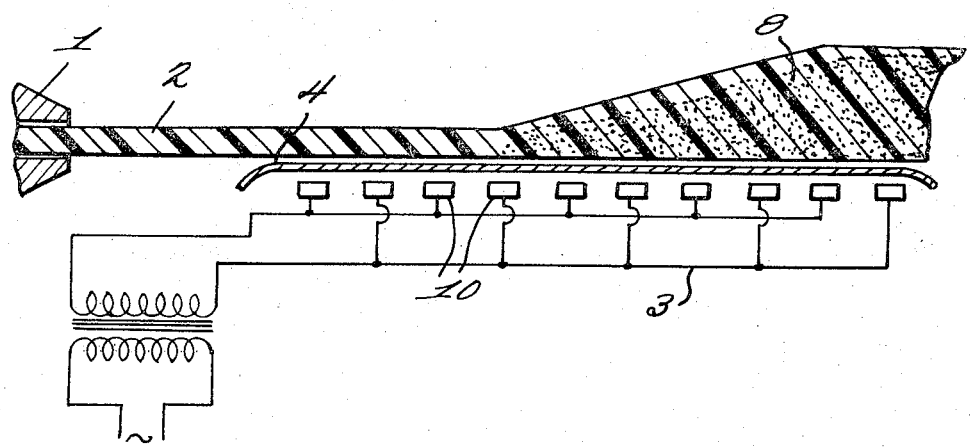
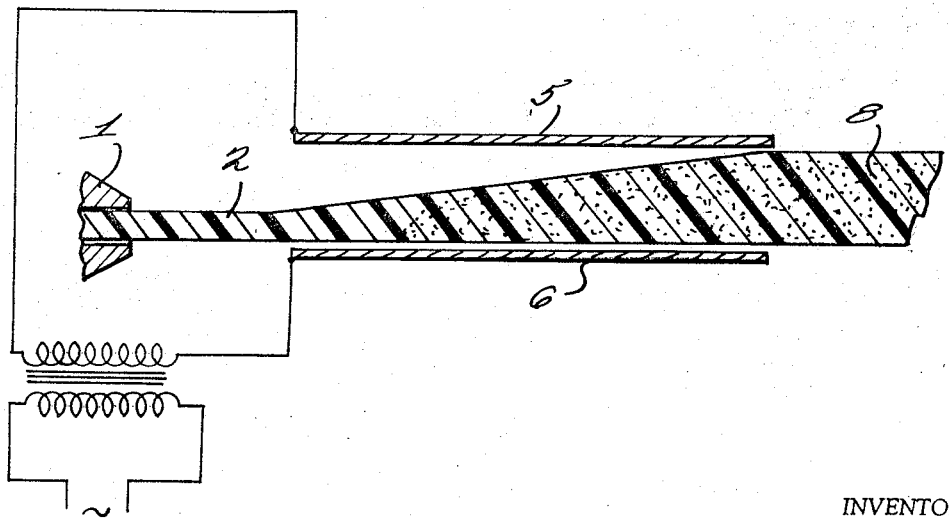
INVENTORS
KENNETH BOOTHBY EVERARD
TERENCE PERRY
BY Cushman, Darby & Cushman
ATTORNEYS 3,345,439
RIGID THERMOPLASTIC STRUCTURES
Kenneth Boothby Everard and Terence Perry, Welwyn Garden City, England, assignors to Imperial Chemical Industries Limited, London, England, a corporation of Great Britain
Filed Aug. 5, 1963, Ser. No. 301,931
Claims priority, application Great Britain, Aug. 15, 1962, 31,521/62
12 Claims. (Cl. 264—26)

The present invention relates to rigid structures and more particularly to rigid structures containing expanded thermoplastic material.

According to the present invention we provide an integral structure of simple shape, such as a sheet, block, channel or pipe, derived from a rigid thermoplastic polymeric composition and comprising a core of expanded material between two skins of smooth and unexpanded material.

Also according to the present invention we provide a process for fabricating such a structure comprising the steps of:

(a) Forming a simple shaped structure such as a block, sheet, channel or pipe from a rigid composition, comprising a thermoplastic polymeric material and a blowing agent having a decomposition temperature above the $\frac{1}{10}$ Vicat softening point of the material, in a forming operation at a temperature below the said decomposition temperature, (b) While maintaining at least two opposing walls of the structure at a temperature below the decomposition temperature of the blowing agent and preferably below the softening point of the composition, exposing the structure to an alternating high frequency electric field so that the body of the thermopalstic polymeric material between the walls is heated to a temperature above the said decomposition temperature and assumes an expanded state and, (c) Cooling the expanded structure.

Thermoplastic polymeric materials for use in the invention are polymers, copolymers and blends of polymers derived from at least one polar monomer, suitably from vinyl chloride or vinylidene chloride. Examples of blends are those of polyvinyl chloride with copolymers of ethylene (e.g. an ethylene/vinyl acetate or ethylene/methyl methacrylate copolymer). Useful structures are formed from polymers of vinyl chloride or from copolymers of vinyl chloride containing at least 80% vinyl chloride since they have good insulative and flame-proof properties and are resistant to attack from a wide variety of chemicals.

By a rigid composition we mean a composition having a B.S. softness of from 0 to 10 in the unexpanded state, as measured by British Standard No. 2782, Method No. 307A. Such compositions may be formed from the unplasticised polymers or from polymers mixed with small amounts of plasticiser. The amount of plasticiser that may be used without destroying the rigidity of the composition will depend upon the choice of polymer and the choice of plasticiser and we have found for example that, for polymers of vinyl chloride, from 2 to 20 parts by weight of plasticiser may be used per 100 parts of polymer. If more than 20 parts of plasticiser are used, the rigidity of the composition may be destroyed; on the other hand, it is preferred to have some plasticiser present to act as a processing aid, particularly if the polymer is a homopolymer of vinyl chloride. Suitable plasticisers are ester-type plasticisers such as phosphates, adipates, sebacates and the isomeric phthalates or polymeric plasticisers such as epoxy resins. Where the thermoplastic polymeric material is a copolymer of vinyl chloride, chlorinated paraffins may be used as plasticisers.

The blowing agents that may be used in the formation of our structure are those which have decomposition temperatures above the softening points of the thermoplastic polymeric materials used. Where the shaping step entails heating the thermoplastic material above its softening point, the blowing agent should be chosen such that its decomposition temperature is above the forming temperature used, or less uncontrolled foaming will occur during the shaping step. On the other hand, the decomposition temperature of the blowing agent should not be above the temperature at which the degradation of the thermoplastic polymeric material would occur to any substantial extent. Preferred blowing agents are those that are solid at room temperature since they are then incorporated easily into the polymeric compositions. For economic reasons it is preferred to use blowing agents that on decomposition provide large volumes of gas per volume of blowing agent and, in general, the larger the volume of gas produced, the more attractive the blowing agent. We have found azodicarbonamide, which has a decomposition temperature of about 180° C.–210° C., to be very suitable, especially in combination with polyvinyl chloride and vinyl chloride copolymer compositions.

The amount of blowing agent used will depend to a large extent on the choice of agent and on the density required in the final product, the use of greater quantities of blowing agent resulting in the production of lower density products. In general, we have found that the use of from 1 to 10 parts by weight of blowing agent per 100 parts of polymer gives acceptable products.

The compositions used in the manufacture of our structures may also include other ingredients such as heat and light stabilisers, fillers, pigments, lubricants and mould-release agents, if desired.

The blowing agent may be mixed with the polymer by any means which will give good mixing without the use of temperatures which would cause its premature decomposition. For example, the ingredients may be mixed in a Banbury mixer or on a two roll mill or by extrusion compounding; they may also be subjected to high speed mixing to form a powder. During the mixing operation other ingredients, if any, may also be incorporated in the composition.

The resulting composition is then formed into the desired structure by any suitable process, e.g. by extruding or by calendering which may be followed by pressing. Again, it is necessary to ensure that the temperature of the forming operation does not approach the decomposition temperature of the blowing agent.

The formed structure may be of any simple cross-sectional outline, for example it may be a block, sheet, channel or pipe. The block and sheet may be flat or curved and regular or irregular in plan; the channel may be of any suitable cross-section such as arcuate or describing two or more sides of a polygonal figure and the pipe may be curved or polygonal in cross-section.

After formation, the structure is exposed to an alternating high frequency electric field which heats the structure until it attains a temperature above the decomposition temperature of the blowing agent. Simultaneously, opposing walls of the structure are maintained at a temperature below the said decomposition temperature in any suitable manner such as by air-cooling or by maintaining them in the close proximity of any suitable heat-controlling means. The temperature at which the walls of the structure are maintained will control the thickness of the unexpanded skin of the resultant structure: lower temperatures giving thicker unexpanded skins. The thickness of skin desired depends upon the intended use for the expanded structure. For example, where the structure is to be used as a space filler and the walls of the structure will be protected for the most part, a reasonably high wall temperature may be maintained during this electrical heating step, resulting in a structure of low overall density, ideal as a filler and having a thin skin which will provide adequate protection during handling. On the other hand, where the structure is a sheet which is to be used for insulated curtain walling, for example, a lower wall temperature should be maintained in the heating step resulting in a thicker skin providing adequate protection for the expanded core.

By a high frequency electric field we mean a field of electric or electro-magnetic origin, and it may be provided by supplying an alternating voltage to a stray field heater or to two parallel spaced platens (e.g. of a high frequency heater), by electromagnetic induction (e.g. in a coil supplied with a high frequency alternating current and within which the structure to be heated is placed) or by the use of wave-guide techniques. The more common methods are to set up a field between the platens of a radio frequency heater or to use a stray field heater.

It is preferred in general that the structure to be treated is expanded uniformly and in order to obtain such uniformity the substance of the structure (formed from the composition comprising the blowing agent and the thermoplastic material) should be exposed to a uniform field across its section. It is therefore desirable to subject the entire section of thermoplastic material to an electric field of uniform intensity. Where the structure is a relatively thin flat sheet, it may be passed over the plates of a stray field heater. On the other hand it may simply be placed between parallel spaced flat platens of suitable size, and for thicker sheets this is the preferred method as the use of a stray field heater will only give a uniform field through relatively thin sections. For more complicated structures, the platens will require to be suitably modified. Thus, for a curved sheet suitably curved platens will be required and for a tube of circular cross-section, two concentrically mounted tubular platens of suitable size would be required, through which the tubular structure could pass. Instead of platens, parallel spaced flat coils could be used and would achieve the same effect although the consequent field would be prependicular to the field set up between platens.

High frequency heating apparatus which may be used in the process of the invention will now be more fully described with the aid of the accompanying drawings in which:

FIGURE 1 shows in a very diagrammatic manner a stray field heater;

FIGURE 2 shows in a very diagrammatic manner a simple form of arrangement of the platens of a radio frequency heater;

Figure 3:
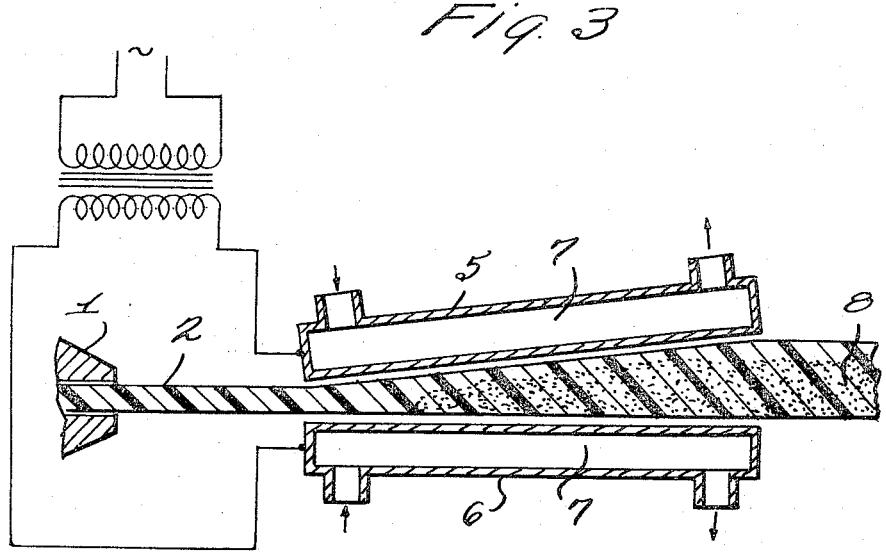
FIGURE 3 shows a modification of the apparatus of FIGURE 2.

In one process of the invention for forming our foamed structures in sheet form, using the apparatus illustrated in FIGURE 1, the thermoplastic mixture is extruded from the die 1 as a sheet 2 and passed over the stray field heater 3, which comprises a number of separate conducting plates 10 mounted at spaced intervals along the direction of travel of the sheet. Alternate plates are electrically connected together as shown and an alternating current is supplied to the terminals of the two sets of plates. The electrical field so set up between the plates is such that it normally extends above and below the line of the plates.

It is preferred to aid the passage of the sheet over the plates and this may be done by mounting the sheet on a belt 4 which is preferably formed from a non-conducting substance such as a plastic laminate. The walls of the sheet may be maintained below the decomposition temperature of the blowing agent simply by exposure to the air by controlling the temperature of the belt. When the latter temperaure controlling means is used, it is prelerred to use two belts, under and on top of the sheet, so that the temperatures of both walls of the sheet may be accurately controlled. Where air cooling of the sheet is used, very little in the way of temperature control can be achieved and the resultant sheet is in general fairly thick-skinned.

In a further process accorling to the invention for forming our foamed structures in sheet form, for example, the thermoplastic mixture is extruded from the die and passed between the two platens 5 and 6 of a radio frequency heater of sandard design, as shown in FIGURE 2. The platens are preferably adjusted so that the sheet may just pass between them. It is preferred to keep any air gap between the sheet and the platens as small as is consistent with the maintenance of stable conditions having regard to the type of heater being employed.

In order to keep the walls of the sheet at a temperature below the decomposition temperature of the blowing apent, air cooling may again be used.

When the sheet is heated so that its core exceeds the decomposition temperature of the blowing agent it will assume an expanded form 8 and therefore the initial positioning of the platens should be such as to allow for the expansion. However, if the platens are left parallel, the uniformity of the field as formed along the length of the heater will result in most of the expansion of the sheet taking place abruptly toward the end of the heater. In order to achieve a more gradual expansion, one of the platens of the heater may be angled such that the field is of greater intensity at the leading edge of the heater than at the trailing edge. It is therefore preferred that one of the platens 5 is angled as shown in FIGURE 3, the angle being such as to allow for the expansion of the sheet on heating. The two platens may together act as a die for obtaining the expanded sheet in any desired thickness. Here again, air cooling may be used to maintain the walls of the sheet at a temperature below the decomposition temperature of the blowing agent. However in this case, as the platens are in close proximity to the walls of the sheet, they themselves may be maintained at a suitable temperature to give the desired temperature to the walls of the sheet. The temperature of the platens may be controlled by any suitable means. For example, the platens may be hollow as shown and the cavities 7 may be supplied with a circulating fluid at the appropriate temperature. Where the fluid is a conductor of electricity, suitable techniques for the transfer of the fluid should be employed so that its presence and circulating movement do no interfere with the operation of the equipment. Suitable cooling fluids are oils or gases such as air.

Figure 4:
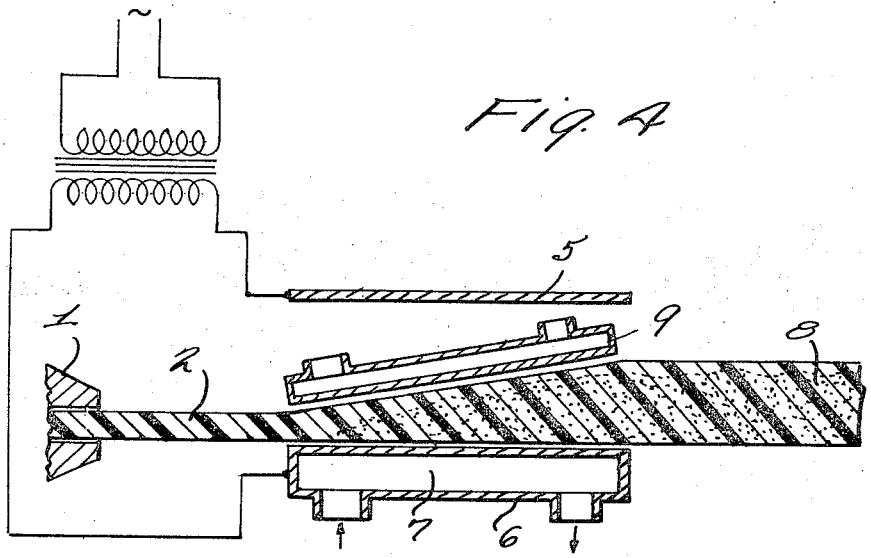
FIGURE 4 shows a further modification of the apparatus of FIGURE 2.

If it is desired to keep the two platens parallel, a plate 9 may be placed between the two platens at any desired angle so that it and one of the platens may together act as the die (see FIGURE 4). The plate may be fabricated from any suitable rigid material but it is preferred to use a conducting material so that the electric field constants of the heater are not affected to any appreciable extent. Where this system is used, the temperature of this plate should be controlled in order to effect the desired temperature control in the wall of the thermoplastic material.

The shaped article to be expanded may be pushed between, or may be drawn between, the platens. Using either method, it is preferred to ease the passage of the article between the platens and this may be done, for example, by coating the platens with a low friction coating or lubricant which may be a liquid or solid; a coating of polytetrafluoroethylene is very suitable. On the other hand, the article again may be mounted on an endless belt, preferably of non-conducting material, as it passes between the platens.

The strength of the field required will depend upon the distance between the platens, the choice of thermoplastic material, the thickness of the thermoplastic material, and the decomposition temperature of the blowing agent; it may be controlled by varying the frequency. If too strong a field is used, the air may become ionised.

The choice of frequency will depend upon the choice of thermoplastic material and will also depend upon the atmospheric conditions such as the humidity and air temperature. Suitable frequencies are from 100 kc./s. to 100 mc./s.

The choice of distance between the platens depends essentially upon the thickness of the article, it being desirable not to have too great an air gap for the reasons outlined above.

The structures of the invention are particularly useful in the fabrication of sound-proof panels or heat-insulative structures.

The invention is illustrated by the following example in which all parts are expressed as parts by weight.

*Example*

The following ingredients were mixed together on a two-roll mill for 10 minutes at roll temperatures of 145 and 155° C. and then formed into chip having a B.S. softness of 0:

| | Parts |
|---|---|
| A polyvinyl chloride having a Fikentscher K value of 55 | 100 |
| Mixed phthalate esters of alkyl groups having 7–9 carbon atoms | 10 |
| "Ferroclere" 1203, believed to be a Ba/Cd soap | 3 |
| "Ferroclere" 900, believed to be a condensation product of epichlorhydrin and diphenylolpropane | 2.5 |
| Calcium stearate | 1.0 |
| Stearic acid | 0.5 |
| Azodicarbonamide | 2.0 |

The chip was fed to a 2½" extruder having a slit orifice of 3" x 3/16" and was extruded at 155° C.

The strip so formed which had a density of about 80 lbs./cu. ft., was then passed on a polyester/glass fibre endless belt over a stray field heater as illustrated in FIGURE 1. The heater was approximately 30" long and comprised a number of copper rods of ½" square cross-section, the rods being mounted at 2" intervals in the direction of extrusion. An electromagnetic field was established along the heater by the application of a 38 mc./s. alternating current. The current taken by the heater was 0.45 amp at full load.

On passing over the heater, the thermoplastic strip was heated at its centre to a temperature above the decomposition temperature of the blowing agent while the walls were kept cool as they were exposed on the one hand to air and on the other hand to the belt which was at room temperature. The centre of the strip expanded due to the decomposition of the blowing agent and an expanded strip of rigid polyvinyl chloride was obtained having smooth and unexpanded walls. The density of the expanded strip was found to be 18–20 lbs./cu. ft. overall. The minimum internal density of the strip was found to be 3–4 lbs./cu. ft.

If the process is repeated with a strip wall temperature controlled at 150° C. instead of about room temperature, the resultant sheet will be found to have an overall density of about 8–10 lbs./cu. ft. and will have much thinner unexpanded walls.

I claim:

1. A process for fabricating an integral structure of simple shape derived from a rigid thermoplastic polymeric composition and comprising a core of expanded material between two skins of smooth and unexpanded material which comprises the steps of:
   (a) shaping an initially rigid composition in a preselected shape of cross section, said composition comprising a thermoplastic polymeric material and a blowing agent having a decomposition temperature above the 1/10 Vicat softening point of the material in a forming operation at a temperature below the said decomposition temperature to give a simple shaped structure, said rigid composition being substantially shape-sustaining at any temperature below the decomposition temperature of the blowing agent,
   (b) while maintaining by a cooling means at least two opposing walls of the said structure at a temperature below the decomposition temperature of the blowing agent and preferably below the softening point of the composition, exposing the structure to a source producing an alternating high frequency electric field to heat the body of the thermoplastic polymeric material between the walls to a temperature above the said decomposition temperature whereby said body assumes an expanded state, said source and cooling means establishing generally one of the dimensions of the same preselected shape of cross section as the original rigid composition, and
   (c) cooling the expanded structure.

2. A process according to claim 1 in which the structure is exposed to an alternating high frequency electric field by passing it between the platens of a radio-frequency heater.

3. A process according to claim 2 in which the temperature of the platens is controlled.

4. A process according to claim 1 in which the structure is exposed to an alternating high frequency electric field by passing it between a first platen of a radio-frequency heater and a plate of conducting material placed intermediate the said platen and a second platen of the heater so as to form with the first-named platen a die for controlling the shape of the expanded structure and giving instead of the dimensions of cross section of claim 1, a controlled increase of the dimensions by means of the spacing of the plate.

5. A process according to claim 4 in which the temperature of said conducting plate and of the platen is controlled.

6. A process according to claim 1 in which surfaces in the heating zone in contact with the structure to be expanded are coated with a lubricant such as polytetrafluoroethylene.

7. A process according to claim 1 in which the structure is a relatively thin flat sheet and is exposed to an alternating high frequency electric field by passing it over the plates of a stray-field heater.

8. A process according to claim 1 in which the structure is carried through the heating zone on an endless belt.

9. A process according to claim 8 in which the temperature of the belt is controlled.

10. A process according to claim 1 in which the thermoplastic polymeric material is a polymer of vinyl chloride containing from 80% to 100% by weight of vinyl chloride.

11. A process according to claim 1 in which the rigid composition contains from 1 to 10 parts by weight of blowing agent for every 100 parts of thermoplastic polymeric material.

12. A process according to claim 11 in which the blowing agent is azodicarbonamide.

References Cited

UNITED STATES PATENTS

| 2,737,503 | 3/1956 | Sprague et al. | 260—2.5 |
| 2,816,852 | 12/1957 | Banks | 156—79 X |

(Other references on following page)

UNITED STATES PATENTS

| | | | |
|---|---|---|---|
| 2,893,877 | 7/1959 | Nickolls. | |
| 2,918,702 | 12/1959 | Yetteran | 156—78 |
| 2,932,323 | 4/1960 | Aries | 156—244 |
| 2,956,310 | 10/1960 | Roop et al. | 156—79 X |
| 2,994,110 | 8/1961 | Hardy. | |
| 2,998,501 | 8/1961 | Edberg et al. | 156—79 X |
| 3,104,192 | 9/1963 | Hacklander | 156—78 X |
| 3,166,454 | 1/1965 | Voelker | 156—78 |
| 3,196,062 | 7/1965 | Krystal | 156—79 |
| 3,216,849 | 11/1965 | Jacobs | 156—79 X |

FOREIGN PATENTS

| | | |
|---|---|---|
| 800,474 | 8/1958 | Great Britain. |

EARL M. BERGERT, *Primary Examiner.*

CLIFTON B. COSBY, *Examiner.*